US011496899B1

(12) United States Patent
Koster

(10) Patent No.: US 11,496,899 B1
(45) Date of Patent: Nov. 8, 2022

(54) INDICATING NUMBER SOURCES USED TO DEFINE A WHITELIST FOR A SMARTPHONE-BASED ROBOCALL BLOCKING PROCESS

(71) Applicant: Noble Systems Corporation, Atlanta, GA (US)

(72) Inventor: Karl H. Koster, Sandy Springs, GA (US)

(73) Assignee: Noble Systems Corporation, Atlanta, GA (US)

(*) Notice: Subject to any disclaimer, the term of this patent is extended or adjusted under 35 U.S.C. 154(b) by 250 days.

(21) Appl. No.: 16/685,053

(22) Filed: Nov. 15, 2019

(51) Int. Cl.
| | |
|---|---|
| *H04W 12/08* | (2021.01) |
| *H04L 29/06* | (2006.01) |
| *H04M 3/42* | (2006.01) |
| *H04M 3/436* | (2006.01) |
| *H04L 9/40* | (2022.01) |

(52) U.S. Cl.
CPC .......... *H04W 12/08* (2013.01); *H04L 63/101* (2013.01); *H04M 3/42042* (2013.01); *H04M 3/436* (2013.01)

(58) Field of Classification Search
CPC . H04W 12/08; H04L 63/101; H04M 3/42042; H04M 3/436
USPC .......................................................... 726/3
See application file for complete search history.

(56) References Cited

U.S. PATENT DOCUMENTS

| | | | | |
|---|---|---|---|---|
| 6,584,188 | B2* | 6/2003 | Kim ...................... | H04M 1/006 379/142.04 |
| 6,658,455 | B1* | 12/2003 | Weinman, Jr. ...... | H04L 12/2856 709/213 |
| 6,757,360 | B1* | 6/2004 | Tolopka ................ | H04M 1/663 379/67.1 |
| 8,311,531 | B2* | 11/2012 | Haaparanta ......... | H04M 1/2745 455/418 |
| 9,015,130 | B1* | 4/2015 | Michaelis ............... | G06F 13/14 707/689 |
| 9,277,049 | B1* | 3/2016 | Danis ...................... | H04M 3/54 |
| 2007/0143422 | A1* | 6/2007 | Cai ........................ | H04M 3/436 709/206 |
| 2011/0151850 | A1* | 6/2011 | Haaparanta ......... | H04M 1/2745 455/415 |
| 2012/0276877 | A1* | 11/2012 | Balannik ............. | H04M 1/7243 455/412.2 |
| 2015/0023485 | A1* | 1/2015 | Guarriello ............. | H04M 3/436 379/88.23 |

(Continued)

*Primary Examiner* — Binh Kien Tieu
(74) *Attorney, Agent, or Firm* — Blank Rome, LLP

(57) ABSTRACT

A call blocking module in a smartphone is configured to generate a whitelist stored in the smartphone, the whitelist comprising a calling party number ("CPN") using various number sources, such as a contact list, outgoing call list, or incoming call list. As each number source is modified with a new CPN, the whitelist may also be augmented automatically, or based upon a confirmation from a user of the smartphone. A contact center originating voice calls to the smartphone may be configured to generate a text call to the smartphone in order to populate the whitelist with the CPN that will be used when originating a subsequent voice call to the smartphone. Thus, the contact center can originate a text call to the smartphone to potentially increase the likelihood that a subsequent voice call will be passed by the whitelist.

20 Claims, 7 Drawing Sheets

(56) References Cited

U.S. PATENT DOCUMENTS

| | | | |
|---|---|---|---|
| 2015/0249740 A1* | 9/2015 | Jenkins | H04M 1/27453 |
| | | | 455/415 |
| 2016/0330319 A1* | 11/2016 | Farrand | H04M 3/42059 |
| 2017/0070611 A1* | 3/2017 | Silver | H04M 3/02 |
| 2017/0085700 A1* | 3/2017 | Lee | H04M 1/72451 |
| 2017/0353602 A1* | 12/2017 | DeLuca | H04W 8/183 |
| 2019/0199842 A1* | 6/2019 | Wang | H04M 1/724 |
| 2020/0067861 A1* | 2/2020 | Leddy | G06F 21/6245 |

\* cited by examiner

INDICATING NUMBER SOURCES USED TO DEFINE A WHITELIST FOR A SMARTPHONE-BASED ROBOCALL BLOCKING PROCESS

BACKGROUND

Robocalls are generally recognized as unwanted calls. However, the term "robocall" does not have a precise definition as it has various meanings in the industry and to the public. Some federal agencies interpret this term to mean as any telephone call that plays a pre-recorded announcement to the called party. Others consider any unwanted call to be a "robocall," regardless of whether a pre-recorded announcement is played. An issue arises when defining this term based on whether the call is wanted or not. Namely, whether the call is wanted or not cannot be determined until the call is answered by the called party. For example, a pre-recorded call asking the called party about renewing their car warranty is currently frequently a scam and thus may be readily identified as an unwanted call by the called party. Other pre-recorded calls may inform the called party that their car, which they brought into the dealer for servicing, is ready for pickup. In this case, if the called party actually brought their car into the dealer for servicing, then the called party will likely consider this a wanted call. Thus, it cannot be completely determined whether the call is wanted or not until after the call has been answered. However, many robocall mitigation techniques attempt to predict whether the call would be wanted and block the call based on the prediction. Obviously, attempting to predict whether an unanswered call is wanted or not is problematic.

Many of these unwanted calls received are scams, unsolicited telemarketing calls, many of which are illegal or fraudulent. Certainly, many of these calls are viewed as a nuisance and unwanted, though some are difficult to predict with certainty prior to answering. Many illegal calls rely on a concept called "spoofing." This term is frequently understood as indicating a telephone number that the caller is not authorized to use. Scammers may populate the calling party number ("CPN", also sometimes referred to as the ANI) with an unauthorized number to increase the likelihood that the called party will answer the phone. However, it is not necessary to have definitive agreement on the scope of the terms "robocall" and "spoofing" to appreciate the inventive concepts herein.

The industry has collectively attempted to reduce unwanted robocalls by various means and technologies. So far, no one approach appears to be 100% effective in eliminating such calls, nor is likely to be, as there are various types of unwanted calls. One approach is based on executing a "robocall call blocking" i.e., a mobile application in a smartphone intended to block unwanted calls. It is estimated by the Cellular Telecom Industry Association ("CTIA") that there are hundreds of such robocall blocking mobile applications that can be readily downloaded and used to reduce the volume of unwanted calls.

One such technique for processing unwanted calls by a mobile application is to examine the calling party number (assuming the call is delivered with a calling party number) and check that number against a list of allowable or prohibited numbers. This list of allowable numbers is sometimes called a "whitelist" and the list of prohibited numbers is sometimes called a "blacklist." In some instances, the mobile application will launch an Internet-based query that includes the calling party number to a remote service provider operating the whitelist or blacklist database. Frequently, the number is checked against a blacklist, which may be populated based on crowd-sourced data or other means. This reflect that frequently unwanted calls spoof the same unauthorized number when making calls, so that that particular CPN is reported as an unwanted call. If the query response indicates the calling party number is not on the blacklist, then the mobile application alerts the user of the incoming call. If the number is on a blacklist, the mobile application is informed and may dispose of the call by suppressing ringing, forward the call to voicemail, or rejecting the call. Thus, these steps (the processing of the incoming call, checking the calling party number, and determining whether to alert the user) must occur quickly so as to avoid delay. Storing the list in a manner to facilitate the speed of processing is important, as there is a limited amount of time in which the searching must be accomplished.

Another approach is to check the calling party number against a whitelist. In this case, the mobile phone may use the list of telephone numbers in the user's contact list as the basis of an internal whitelist. The concept of querying a list is similar as described above except that the query is internal to the smartphone, i.e., no external database is queries. A drawback of this approach is that while commonly used telephone numbers may be in the contacts list and thus will pass the processing of the whitelist, there may be any number of otherwise desirable calls that will be blocked, because the numbers are not in the whitelist (i.e., the contact list).

For example, consider the prior example of a person who has dropped off their car for servicing at a car dealer. They may not have the telephone number of the dealer listed in their contact list. Yet, the dealer may originate a call to the person to inform them that the servicing of their car is completed and is ready to be picked up. If the mobile application checks the incoming telephone number and determines it is not listed in the user's contact list, the smartphone would block the call in some manner (e.g., suppress ringing to the user). The user may not then receive an important and wanted call. Thus, using the contact list as the number source for populating the whitelist may be deficient in some cases.

This illustrates that merely using the contact list found in a smartphone may not be sufficient and desirable. The user may find it necessary to disable the mobile application's call blocking processing, in order to receive wanted calls. However, doing so opens up the possibility of getting unwanted calls. Thus, improved methods and systems are needed to ensure that if the mobile application does process robocalls to suppress ringing or otherwise treat the call as an unwanted call, that approaches are defined to ensure that important calls are being delivered to the called party. Such approaches need to consider both the speed of processing in which the list searching occurs, and must also consider the available memory storage requirements, since memory storage in a smartphone is finite. A greater level of a control and granularity is required for the user to manage which calls are treated as unwanted calls, and a more efficient means of searching and storing the lists is needed.

BRIEF SUMMARY

In general, embodiments of the present invention provide computer-program products, methods, systems, apparatus, and computing entities for facilitating the completion of calls from a call center to a called party using a whitelist. In one embodiment, various mechanisms are provided for providing greater management of how the whitelist is generated and populated. In another embodiment, a short message service ("SMS") text message is sent to the called party prior to originating a voice call, in order to ensure that the calling party number of the subsequently originated voice call is on the called party's whitelist.

As is discussed in greater detail below, the subject matter disclosed herein may be implemented as a computer-controlled apparatus, a method, a computing system, or an article of manufacture such as a computer-readable storage medium. These and various other features will be apparent from the following Detailed Description and the associated drawings.

This Summary is provided to exemplify concepts at a high level form that are further described below in the Detailed Description. This Summary is not intended to identify key or essential features of the claimed subject matter, nor is it intended that this Summary be used to limit the scope of the claimed subject matter. Furthermore, the claimed subject matter is not limited to implementations that address any or all disadvantages noted in any part of this disclosure.

BRIEF DESCRIPTION OF THE DRAWINGS

Reference will now be made to the accompanying drawings, which are not necessarily drawn to scale, and wherein.

DETAILED DESCRIPTION

Figure 1:
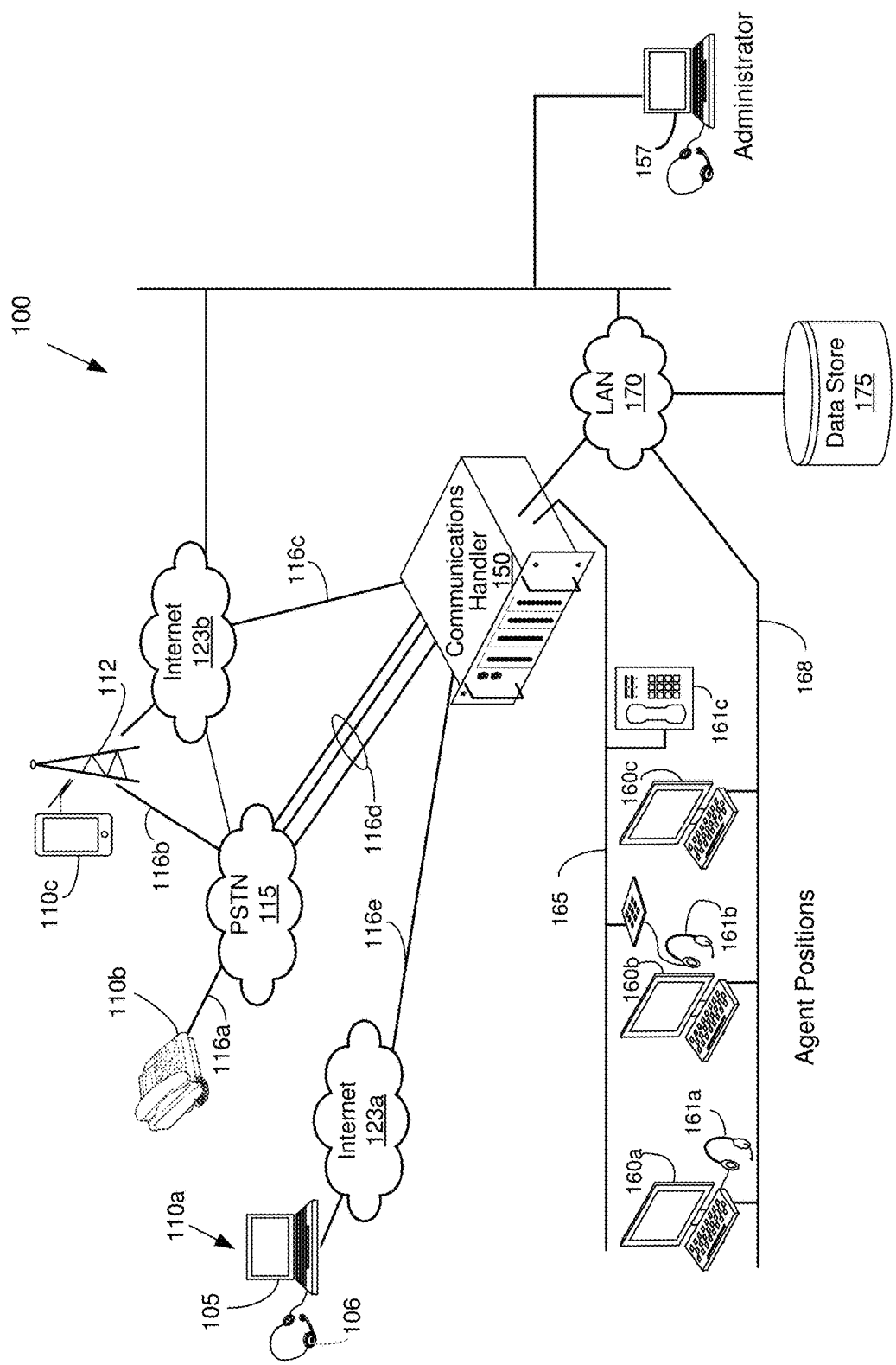
FIG. 1 illustrates one environment in which the concepts and technologies herein may be embodied.

Various embodiments for practicing the technologies disclosed herein are described more fully hereinafter with reference to the accompanying drawings, in which some, but not all embodiments of the technologies disclosed are shown. Indeed, the embodiments disclosed herein are provided so that this disclosure will satisfy applicable legal requirements and should not be construed as limiting or precluding other embodiments applying the teachings and concepts disclosed herein. The claim language should not be construed as being written in a "means-plus-function" form unless expressly indicated via the recitation of a previously recognized "nonce" word interpreted to be in means-plus-function form by a prior Federal Circuit case or by the use of the phrase "means for . . . ." Like numbers in the drawings refer to like elements throughout.

High Level Service Concept

Robocalls can be considered as calls which are unwanted by the called party. However, ascertaining whether a call is wanted or not before the call is answered is difficult. Called parties that use smartphones, that is a cellular phone with computer processing capabilities, may depend on the calling party number ("CPN") that is displayed on incoming calls as an input in deciding whether they will answer the call. If the CPN is that of a number they recognize, they will typically answer the call. However, humans are limited in their ability to recognize previously seen telephone numbers. Further, some wanted calls may arrive with a CPN that the user has not seen before, and thus, the called party cannot be expected to be familiar with that telephone number. That does not necessarily mean the call is unwanted.

Scammers frequently rely on spoofing a calling party number as a means to increase the answer rates. In some instances the scammer will use a number sharing a common service area as the caller's number. This may manifest itself by spoofing a telephone number that has a portion in common with the caller's number. For example, a scammer calling, e.g., 404-555-1212 may using a CPN of 404-555-1234 or 404-556-1234. The use of a common area code ("404") and the same or similar exchange code (555 or 556) suggests that the caller is in the same service area. Thus, this type of spoofing is called "neighbor spoofing" since the caller is attempting to suggest that they are calling from the same neighborhood.

Blocking calls from a spoofed number is frequently not effective in stopping scam calls. The scammers may originate numerous calls, each with a different spoofed telephone number. Thus, blocking the CPN of a scam call is unlikely to be effective for the next call, which may use a different CPN. Further, this approach has the possibility of blocking calls from the actual persons assigned those numbers.

A mobile application may be installed in the operating environment of the smartphone or may be downloaded into the smartphone to reduce the number of unwanted calls. One approach for ascertaining whether a call is wanted or not is to examine the CPN and compare that value with numbers stored in the user's smartphone. Specifically, the CPN could be compared with numbers listed in the user's contact list, recent calls list, emails, instant messages, or any other source. In one embodiment, the CPN could be compared with the telephone numbers listed in a recent list of outbound SMS text messages. The purpose for doing the comparison is that if the CPN is found listed in one of these applications, then it is presumed that the user knows that party or has had prior communication with that person, and therefore would consider a call from that number as wanted. In other words, the user of the smartphone would not want a call from that CPN call to be treated as a robocall or an unwanted call by the smartphone.

It is expected that individuals may receive incoming calls from callers that are not in their contacts list stored in their smartphone. Many such wanted calls maybe envisioned which occasionally are needed, such as car repair calls, medical test results, automated reminders, financial fraud alerts from banks, emergency notifications, etc. Callers may not recognize such numbers and their smartphones may not match these numbers in a contacts list causing important calls to be missed.

One way to avoid these consequences is for the whitelist to be generated using various list of numbers (a "numbers list") stored in the smartphone for various applications. For example, the whitelist could comprise the set of all numbers in the contact list, numbers used in recent outbound voice/text calls, numbers used in recent inbound voice/text calls, or in some other application. Another embodiment involves reviewing the content of email messages or private messaging apps to ascertain telephone numbers that should be included in the whitelist. Upon checking their email, the smartphone would download and parse the email, which may include the CPN in the header and/or body of the email. Any telephone numbers included, such is in the closing signature block of the sender, could be added to the whitelist. Then, on a subsequent incoming voice call, the CPN of the voice call would be checked against the white list. If found in the whitelist, then the incoming call would be treated as a wanted call.

In one embodiment, the caller's telephone number (i.e., the CPN for an incoming call to the user of the smartphone) is stored by the called party sending an SMS text to the called party. The text would use the CPN of the subsequently originated voice call, so that when the voice call is received by the smartphone, the CPN is stored in a recent list of text calls. Once the match is found, then the smartphone would allow the voice call bearing the same CPN to be offered to the user.

The text or email message is necessarily sent prior to the voice call, and the contents of the message may reflect that the caller is attempting to convey important information to the called party, and indicating the telephone number that will be used to make that call. For example, the text message might state: "This is ACME Bank seeking to speak to you about your credit card. We will be calling you shortly between 3:00 p.m. and 3:15 p.m. from the number 800-555-1212. Please answer this important call. Please reply with "other time" to schedule another time for the call." The contents of the message may reflect an anticipated time at which the voice call may originate. Typically, a text message will be sent shortly before the voice call (typically within one hour of the voice call, and frequently within 10 minutes of the voice call). If an email is being sent, the rate at which the user reviews the email is typically slower, so the email message is typically sent earlier, such as one day or 36 hours prior to originating the voice call.

In some embodiments the text message or email message may include instructions for the called party to request another date or time for the call (as indicated in the above example). For example, the text message could prompt the user to reply with a keyword to request a different time or to confirm whether additional time is needed. A user receiving the text message could select a link included in the text message to request another date/time for the voice call, or could indicate another date/time at which the user will initiate the callback.

In the above example, a caller can send the text or email as a "preparatory" message to "seed" the CPN in the smartphone application to facilitate a subsequent voice call. The purpose of sending a preparatory message is to have the smartphone not treat the voice call as an unwanted call. In this sense, the text or email message helps "prepare" the smartphone to expect the call and process it as a wanted call. Once the CPN is stored in the smartphone (and in the whitelist), there typically is no further to send a text or email to "seed" the CPN to avoid blocking that number. However, the caller can nevertheless subsequently send a text or email as an "informational" message to increase the called party's awareness that a voice call will be originated and to persuade the called party to answer the call. A message sent as an informational message necessarily follows a preparatory message, as the purpose of the informational message is not to seed the smartphone with the CPN (as this has already been done with the preparatory message), but to encourage the called party to answer the call when it is presented to them. Hence, an informational message will not necessarily use the same CPN, but typically will. While an informational message is not required to facilitate the acceptance of the voice call by the blocking application, the preparatory message is required. In essence, the purpose of the preparatory message is to mitigate the blocking application to the subsequent voice call. However, it is possible that the CPN in the preparatory message may have been removed from the whitelist, so that including the CPN in the informational message may transform the message into a prepatory message.

Mobile Application

The above represents several embodiments of actions that a contact center or caller can perform to facilitate the subsequent voice call from being treated as a robocall or unwanted call. Next, various corresponding actions that can be performed by the smartphone are reviewed, which can adapt to such actions.

A smartphone can be designed to automatically identify a telephone number in a prior voice call, text call, email message, or in the user's contact list and add it to the whitelist. The smartphone can also be defined to review other messages and glean the presence of a telephone number for addition to a whitelist. Then, for each and every incoming voice call, the smartphone can identify the CPN and either compare it to the whitelist, or compare that CPN to each of the stored telephone numbers in the various number lists associated with various mobile applications. If there is a match, then the voice call can be processed as a wanted call.

As evident from above, reference to a "whitelist" does not intend to limit the implementation of how data structures are used in the mobile application to indicate a number in the list. For example, consider a whitelist that is generated using the user's contact list and the number list of recent outbound voice calls. A whitelist could encompass the superset of the numbers in those two lists. In one case, a separate data structure is statically defined as the whitelist that lists the superset of the numbers and that is stored in memory. Each time one of the constituent lists is updated, the whitelist needs to be updated as well. This approach consumes more memory, as numbers in the whitelist will duplicate numbers found in other lists. However, as a separate stored list, or a separately stored list of pointers to the numbers, a search of the whitelist can be done comparatively fast. If a number is found in that list, the searching is completed and the number is deemed whitelisted. Thus, this approach improves the prior art in that a faster, and hence improved, searching of the whitelist may occur.

In another embodiment, the whitelist is defined as a process comparing a CPN dynamically to a set of various numbers list so as to create the function of comparing the CPN to a virtual whitelist each time the comparison is needed. Thus, the whitelist is not a separate static list, but a process which searches defined lists of numbers whenever a CPN is to be checked. Consequently, the whitelist has the advantage of not requiring a duplicate static data structure. More specifically, this provides a technical improvement of requiring less memory, but uses instead, the power of the computer processor in the phone. Thus, if the contact list is a source of numbers used in the whitelist (i.e., it is one of the numbers listed checked), then each time the contact list is updated, it in effect automatically updates the whitelist. In this embodiment, the whitelist is effectively a process where a given number is compared against each of the constituent lists.

Regardless of how the whitelist is accomplished, reference to a "whitelist" by itself, or "creating a whitelist" should not be, in and of itself, be construed as limiting the whitelist to a particular implementation. Further, those skilled in the art will recognize in light of this disclosure that lists of numbers can be implemented by using lists of pointers, indirect pointers, or linked lists to the numbers. Thus, referencing the use of a whitelist to check a particular calling telephone number can occur any of the above identified ways.

However, there is an impact in this operational mode whereby the whitelist is assumed to be a superset of the various identified lists. Essentially, a caller can overcome the call blocking application by sending the called party a text, indicating their telephone number. This would place the calling party number on a list of recent incoming texts. Then, a subsequent voice call using that telephone number will not be blocked. Thus, scammers initiating robocalls may originates text calls to the called parties prior to every voice call. In some environments, scammers will be discouraged from doing so since generating a large number of texts may cause additional costs to be incurred. However, smartphone users will likely desire a way of mitigating the possibility of be inundated with text messages informing them of a voice call, wherein the text and the voice call are unwanted.

A consequence of this deficiency is that smartphone users may seek to disable the feature of generating a whitelist from text messages, which does not prevent them from receiving such text messages, but would further allow other voice calls to be received if the CPN was in their contact list. However, that would not allow called parties to receive the occasional call from other entities (like their dealer servicing their car and informing the car is ready). What is required then is a method of allowing the smartphone users to better manage how their whitelist is generated and updated. Thus, corresponding procedures are disclosed herein to allow the user of the smartphone to have greater control of how the smartphone will process such communications for purposes of creating a whitelist.

In one such approach the user can manage which of the various lists in the smartphone are used to constitute the whitelist. There are scenarios where the called party may desire to only allow incoming voice calls from those numbers listed in their contacts list. Further, the called party may desire to only allow incoming voice calls from those numbers in their contacts list and outbound voice calls that they have originated. The theory is that if the called party made a call to a particular person, they would likely want to receive a call from that same person. Or, a person may also want to whitelist telephone numbers listed in their incoming emails. Frequently, these emails could be relatively important (e.g., work related) and business emails typically include a closing which identifies the person, their title, address, and work contact information (including telephone/cell phone numbers and email). Thus, the user may find it desirable to auto populate these numbers into their whitelist. Similarly, users may find it useful to add texting numbers into their whitelist. Again, if a user finds it desirable to send a text to that person, the user may find it desirable to receive a call from that person. Allowing the user to manage these numbers individually and as a group provides additional control and flexibility to the user.

Exemplary Application Context

FIG. 1 shows one embodiment of a contact center architecture 100 illustrating the various technologies disclosed herein. The contact center shown in FIG. 1 may process voice calls that are inbound-only, outbound-only, or a combination of both (sometimes referred to as a "blended" contact center). Thus, in some instances, the contact center may be referred to as a call center when referring primarily to the context of handling calls. Although many aspects of contact center operation are disclosed in the context of voice calls, in various embodiments, the contact center may process other forms of communication such as, for example, facsimiles, emails, text messages, video calls, and chat messages.

Since the contact center may handle calls originating from a calling party, or initiated to a called party, the term "party" or "remote party" without any further qualification, refers to a person associated with a call processed by the contact center, where the call is either received from or placed to the party. The term "caller," if used, will generally refer to a party communicating with the contact center, but in many cases this usage is exemplary. Thus, use of the term "caller" is not intended to limit the concepts to only inbound calls or voice calls, unless the context dictates such.

Depending on the embodiment, inbound voice calls may originate from calling parties using a variety of different phone types. For instance, a calling party may originate a call from a conventional analog telephone 110b connected to a public switched telephone network ("PSTN") 115 using an analog plain old telephone service ("POTS") line 116a. The call may be routed by the PSTN 115 and may comprise various types of facilities 116d, including, but not limited to: T1 trunks, SONET based fiber optic networks, ATM networks, etc. Various types of routers, switches, bridges, gateways, and other types of equipment may be involved in the processing of the calls.

Inbound voice calls may also originate from a smartphone device 110c, such as a smartphone, tablet, or other smart device, which wirelessly communicates with a mobile service provider ("MSP") 112. The voice calls may be routed to the PSTN 115 using an integrated services digital network ("ISDN") interface 116b or other types of interfaces that are well known to those skilled in the art. In particular embodiments, the MSP 112 may also route calls as packetized voice, referred to herein as voice-over-IP ("VoIP") to an Internet provider 123b using Internet-based protocols. For convenience, unless indicated otherwise, the term "trunk" refers to any type of facility 116c, 116d, or 116e providing voice calls to, or from, the contact center, regardless of the type of protocol or technology used. Specifically, a "trunk" is not limited to time-division multiplexing ("TDM") technology. Inbound voice calls may also originate from a calling party employing a so-called "IP phone," "VoIP phone," or "soft phone" 110a. In one embodiment, this device may comprise a computing device 105, such as a laptop, computing tablet, or other electronic device, which interfaces with a headphone/microphone combination, also referred to as a headset 106. The computing device 105 may in turn be connected to an Internet 123a. Those skilled in the art will recognize that a variety of protocols and facilities may be used to convey voice calls.

The smartphone 110c may also incorporate a mobile application for processing inbound calls for purposes of blocking unwanted calls. The mobile application may be loaded into the smartphone at the time of purchase, i.e., provided by the smartphone manufacturer or may be downloaded by the user of the smartphone from an application store. The mobile application may various determine based on criteria whether an inbound call to the smartphone should result in alerting to the user, or whether the call should be rejected, blocked, or forwarded to a voicemail messaging service.

In various embodiments, inbound calls from callers to the contact center may be received at communications handler 150, and more specifically a call handler, which is a computer-based processing system configured to process voice calls, such as SIP (session initiated protocol), VoIP (voice over Internet Protocol), or TDM (time division multiplexing) technology-based voice calls. In certain embodiments, the call handler could be, e.g., an automatic call distributor ("ACD") or a dialer for originating calls. In particular embodiments, the call handler 150 may be a specialized switch for receiving and routing inbound calls under various conditions. The call handler 150 may route an incoming call over contact center facilities 165 to an available agent. Depending on the embodiment, the facilities 165 may be any suitable technology for conveying the call, including but not limited to a local area network ("LAN"), wide area network ("WAN"), ISDN, or conventional TDM circuits. In addition, the facilities 168 may be used to communicate non-voice data from the call handler 150 for presentation to the agent's workstation 160. In other embodiments, the facilities 165 and 168 may be the same.

In various embodiments, calls may be routed over facilities 165 to an agent for servicing. That is, for example, the party may speak with an agent to receive customer service. An agent typically uses a computing device 160*a*-160*c*, such as a personal computer, and a voice device 161*a*-161*c*. The combination of computing device 160*a*-160*c* and voice device 161*a*-161*c* may be referred to as a "workstation." In many instances, the computing device handles VoIP so that reference to the "computer workstation" or the "agent's computer" refers to the computer processing device of the workstation, but which may be closely integrated with handling voice as well. Thus, for these particular embodiments, the workstation can be assumed to have at least a data capability and may have a voice capability.

An administrator may also use a workstation 157 for administrating the communications handler 150, including setting various configuration parameters. The workstation 157 may be used to also monitor and/or coach the various agents during calls.

In various embodiments, the call handler 150 may answer an incoming call in a queue if there are no suitable agents available, and/or it may route the call to an interactive voice response system ("IVR") (not shown) to play voice prompts. Depending on the embodiment, the interaction between the call handler 150, agent workstation computers 160*a*-160*c*, as well as other components, may involve using a local area network ("LAN") 170. In particular embodiments, when an agent is interacting with a called or calling party, the agent may use his computer 160*a*-160*c* to further interact with other enterprise computing systems, such as, for example, a customer relationship management ("CRM") server (no shown). The agent can also transfer the call to another agent or supervisor, if required.

In addition to receiving inbound communications, including, for example, voice calls, emails, text messages, and facsimiles, the contact center may also originate communications to a called party, referred to herein as "outbound" communications. In some embodiments, a call handler 150 may comprise a dialer, such as a predictive dialer, to originate outbound calls at a rate designed to meet various criteria. In various embodiments, the call handler 150 is typically configured to dial a list of telephone numbers to initiate outbound calls. Data for the calls may be stored in a data store 175. In many aspects, the path for the outbound call is the reverse of what is described from the inbound calls. The call handler originates the call to the called party and will join that call as a call leg with another call leg to one of the agents, thus creating an end-to-end call between the agent and the called party. Thus, the dialer may originate the call to various carriers, which and then routed to the called party. The dialer may also then connect that call to an available agent. Such operation is well known in the art.

Although a number of the above entities may be referred to as a "component," each may be also referred to in the art as a "computing device," "unit", "server" or "system." A server may incorporate a local data store and/or interface with an external data store. Use of the word "server" does not require the component to interact in a client-server arrangement with other components, although that may be the case. Further, the above components may be located remotely from (or co-located with) other components. Furthermore, one or more of the components may be implemented on a single processing device to perform the functions described herein. In addition, the contact center architecture 100 may be provided as a hosted solution, where the call processing functionality is provided as a communication service (a so-called "communication-as-a-service" or "CaaS") to a contact center operator. Thus, there is no requirement that the components identified above must be actually located in a contact center location or controlled by a contact center operator. In addition, depending on the embodiment, the agent positions may be remotely located from the other components of the contact center, sometimes referred to as a "virtual contact center." Those skilled in art will recognize FIG. 1 represents one possible configuration of a contact center architecture 100, and variations are possible with respect to the protocols, facilities, components, technologies, and equipment used.

Service Operation

Figure 2:
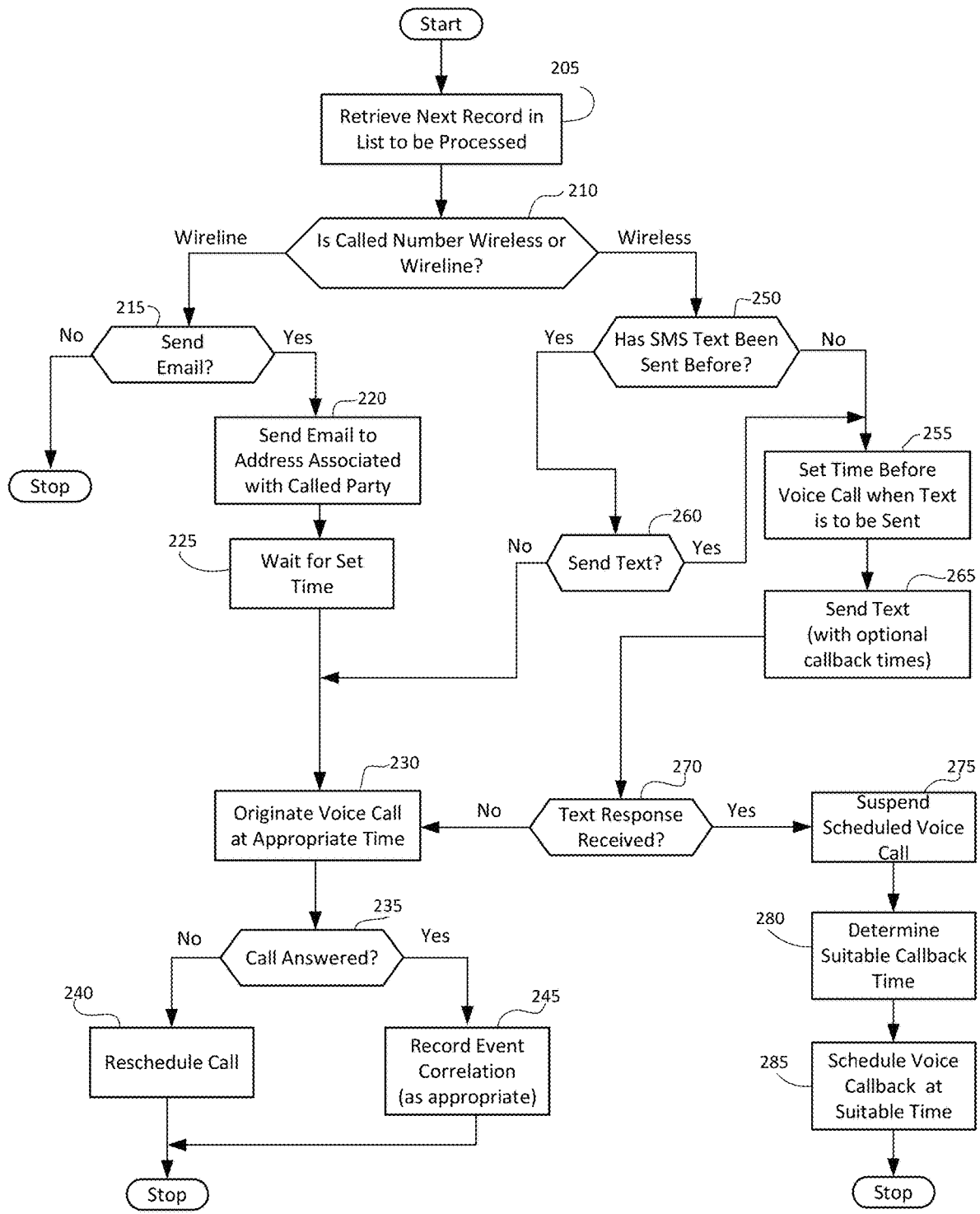
FIG. 2 illustrates one embodiment of a process flow at a high level for facilitating the seeding of a calling party number on a whitelist prior to originating a voice call.

One embodiment of a process flow corresponding to the caller's operation is now discussed. Turning to FIG. 2, a high level embodiment of one implementation is shown, which depicts processing that may occur by the caller, which may be a contact center. The process begins with retrieving a call record from a list, where the record is to be processed in operation 205. With respect to the processing of a plurality of records, the processing of the records may be done at an earlier time, in serial order, in parallel order, or just before each call is made, as will be seen. The process shown in FIG. 2 represent selecting and processing a record for purposes of potentially sending a preparatory text and then a voice call to the contact indicated in the record. However, it is possible to process groups of records and generate lists of those records which have not been sent a preparatory text before and those which have had a text sent, and to then process those lists in a manner consistent with FIG. 2. Thus, one skilled in the art will recognize that the teachings of FIG. 2 can be adapted in various ways and still apply the teachings and concepts disclosed.

The record typically will have various fields of information. It may include the contact's name, telephone number (wireless, home, business, etc.), address information, and numerous other information. In addition, the record may maintain information as to whether an information or preparatory text was previously sent to the wireless number, when it was sent, whether a response was received or the voice call was answered, or whether some other messaging format was used (e.g., an email). Thus, the record may have information indicating whether/when a preparatory or information message was sent previously and the outcome. Alternatively, this information may be obtained from various lists as needed.

A determination is made whether the voice communication is intended to be via a wireline or wireless number in operation 210. If the communication is via a voice call to a wireline number, then sending a text to a wireless number is likely to be ineffective, and it is not possible to send a text to a wireline number. However, an email message could be sent to the email address of the contact in operation 215 in lieu of a text. If no email is to be sent in operation 215, then the process is completed, and another record can be retrieved at operation 205 is so desired. If an email is to be sent, it will likely be information type. That is, the purpose will be to remind or make the contact aware of the future voice call. The email will likely not be a preparatory type message, since there is no mobile application involved. Recall that the voice call is directed to the wireline number. Nevertheless, there may be a benefit by sending the information email message in the form of increased the call answering rates.

The email message is sent in operation 220. The email message may inform the contact as to when the voice call can be expected, who it will be from, the nature of the call, and the calling party number that will be used. In this way, if the contact receives the email message and views it, it may cause the contact to remember that number when they see it displayed on their wireline caller ID device and answer the call.

There is typically a delay between sending the informational email message and then originating the voice call. The appropriate delay is waited for in operation 225, followed by sending the voice call at operation 230. Typically, the appropriate delay between sending an email and the voice call is in the range of a number of hours. In one embodiment, it may be 24-36 hours. This is based on the observation that users typically check their email only periodically (i.e., once or twice a day). Hence, sending an email immediately followed by the voice call is likely to show little or no improvement over not sending an email at all.

If the call is answered in operation 235, then the event is recorded in operation 245. This information is maintained so that it can be determined for this contact whether sending an information message impacted the answer rates. If the call is not answered in operation 235, then the call may be rescheduled in operation 240. At this point, the flow is completed. Or, the process may return to processing the next call record in operation 205.

The above flow is included for completeness, as the application of sending an information type email to a wireline number may increase the answer rate; however, the primary embodiment involves sending message in the form of a text message to a wireless number associated with the contact. To examine this part of the process flow, it is necessary to return back to operation 210 where it is determined that the wireless number will be called. If so, the process then proceeds to operation 250.

At operation 250, a determination is made for this wireless number whether a SMS text has been sent before. This would be to ascertain whether a prior preparatory text was sent for the purpose of seeding the CPN in the called party's smartphone's mobile application. The call record will maintain information indicating whether, when, and what type of prior text was sent to the wireless number, along with potential information indicating whether it was effective, i.e., whether the subsequent voice call was blocked or answered. If a prior text was sent, then another test is made at operation 260 to determine whether another text will be sent. This another text would likely be an informational text, but if the CPN number was removed from the whitelist, then the another text could serve as a preparatory text.

The test in operation 260 for whether to send the may involve various factors. Because a previous text was sent (as determined in operation 250), it may be presumed that the prior text message was a preparatory message, and that the decision in operation 260 is whether an information text should be sent. On the other hand, if the prior text was sent a long time ago, the assumption that the calling party number was 'seeded' in the mobile application may be incorrect. That number may have been removed from the whitelist if it was sent a long time ago. Or, the prior text may have been sent to the called party using a different CPN. In this case, the CPN seeded may have been a different value, and it may be appropriate to send another text, functioning as a preparatory text to seed the mobile application using the current CPN value.

If the text is not to be sent at operation 260, then the voice call is originated at the appropriate time in operation 230, and the process proceeds as described previously. The appropriate time to wait for originating the voice call is dependent on the situation. If, for example, a preparatory text was sent in operation 250, which effectively seeded the CPN, then the voice call in operation 230 may be sent without delay, or at a time determined to optimal via other algorithms.

If at operation 250 a prior preparatory text has not been sent, then the process proceeds to operation 255 where a time is determined where the text is to be sent. Specifically, a time prior to the target time of the voice call is determined when to send the text. Similarly, if a text is to be sent at operation 260, the process proceeds to operation 255 where a time for sending the text is determined.

Although the time for sending the text may be determined as a set amount of time before the target time for sending the voice call, the time for sending the text may also be determined for a set target time which results in the voice call then originating for a set time thereafter. Typically, the time between sending the text and the voice call is a shorter time period compared to sending an email. Text messages are typically opened and viewed much quicker, and hence the time period may be a few minutes to almost an hour. Typically, the range is between 5-15 minutes. The sending time of the text and the sending time of the voice call must also consider the allowable calling windows. Thus, if the calling window closes for a particular contact within the next 5 minutes, then sending a text with the expectation of originating the voice call 15 minutes later is problematic. The voice call would then originate after an allowable calling window. A variety of algorithms can be used to determine the relative and best times for sending the text in operation 265 and the subsequent voice call.

If the text is sent in operation 265, the text may include information to further engage the called party. Even if the text is sent as a preparatory text to seed the CPN into the mobile application, the contents of the text may still include e.g., a target time of the voice call, a request whether the called party would like to re-schedule the call for another target time, whether the called party would like to reject any voice call, or even a link to a portal. Other information may be conveyed including the number or name associated with the subsequent voice call and/or for the purpose of persuading the called party to answer the subsequent voice call. The portal can be used by the called party to access a web site that can facilitate rescheduling the call, or used to engage the called party in an alternative communication channel, such as a chat channel.

After sending the text in operation 265, a response text may be received at operation 270. If, for example, the text sent included options for the called party to reschedule a call back time, then a response text may be received or a response manifested by the called party accessing a web site indicated by a link in the text may be observed. If a response is observed that requests a rescheduled time, then the process proceeds to operation 275 which suspends the scheduled voice call that would normally occur, and the new suitable callback time is determined in operation 280. This new time is then used for scheduling the voice call at operation 285. There are various ways in which a responding text from the caller party (or the called party's access to a portal) may indicate a preferred time. The called party may indicate a preferred time by selecting from a calling window, indicating a new date, or requesting to determine a time later. Once the time is set, the call will originate at that time (not shown).

It is possible that no text response is received in operation 270. There may be a timer defined for waiting for a called party responding text. If the response text not received within the expiry of the timer, then no response is considered as having been received. If a response is received after the timer expires, the response may be disregarded. Alternatively, there may not be any response expected (because no such option was provided to the called party in the text sent at operation 265).

If no text response is received, then the process proceeds to operation 230, where the voice call is originated to the called party using the CPN at the appropriate time. The process then proceeds from there are discussed earlier.

In all cases, the preparatory and/or informational text sent should preferably use the same CPN as which will be used in the subsequent voice call. The contents of the text may also indicate the CPN in the body of the message, in order to further instill into the called party the CPN that will be used in the voice call.

The call originator practicing the process flow of FIG. 2 may maintain records of the outcomes of the voice calls, and further reflects whether a preparatory/information text was sent and when. The call originator can then develop statistics to measure the effectiveness of the various approaches. For example, consider voice calls which originate and which are answered by the desired party (called a "right party connect" or "RPC"). These reflects calls where the agent is speaking with the intended party. Such calls can be further segregated into several groups. A first group involves voice calls where no prior preparatory text was sent. A second group involves voice calls where a preparatory text was sent. A third group involves those voice calls where both a preparatory and information texts were sent. Then, the answer rates for each group can be calculated. For example, the answer rate for a group as a percentage can be calculated as follows: RPC_% rate_for_Group_A=(#of calls in Group A/((#of calls in Group A)+(#of calls in Group B)+(#of calls in Group C))). An answer rate for each group can be determined and used to ascertain whether and to what extent sending a preparatory text and/or an informational text increases the RPC rates for each respective group. It is surmised that the RPC rate increases if a preparatory text is sent and the rate further increases if an informational text is sent as well. Within a group, further analysis can be done to determine an optimal time between sending the preparatory text or voice call. Similarly, analysis can be done to determine the extent of an RPC rate for sending an informational email to a wireline number. In this manner, the collection of statistics can inform which approaches are more effective and to what extent.

Mobile Application Processing

The mobile application may be configured to create a whitelist which is used for screening the CPN of incoming calls. Calls in which the CPN is found in the whitelist will be offered to the user as normal. Thus, whatever configuration the user has for alerting an incoming calls will be used to process the call. For calls in which the CPN is not on the whitelist, the call will not be offered to the user. Typically, the call is routed to voicemail, instead. Other actions may be taken when the number is not on the CPN whitelist. For purposes of illustration, the mobile application is said to block the call if the CPN is not on the whitelist.

The mobile application may generate a separate whitelist in memory from the various sources within the smartphone, or may define how to create a whitelist from the various number sources. The various number sources may include, for example: recent outbound voice calls, recent inbound texts received using a telephone number (not a short code), recent outbound texts to a telephone number, numbers found in a contact list, numbers used in a messaging app, numbers stored in voicemail where the user initiated a callback, etc. A whitelist could be created by creating a separate data structure that is the composite of all the sources. As each number source is updated, then corresponding updates are required to the whitelist if a separate structure is used. Another approach is to define the whitelist as a process, which when it is invoked, checks a number against all the sources. In this latter approach, each source is presumed to be current and there is no separate, duplicate list of numbers. Either approach for checking a CPN against a whitelist is suitable for practicing the concepts and technologies disclosed herein.

Figure 3:
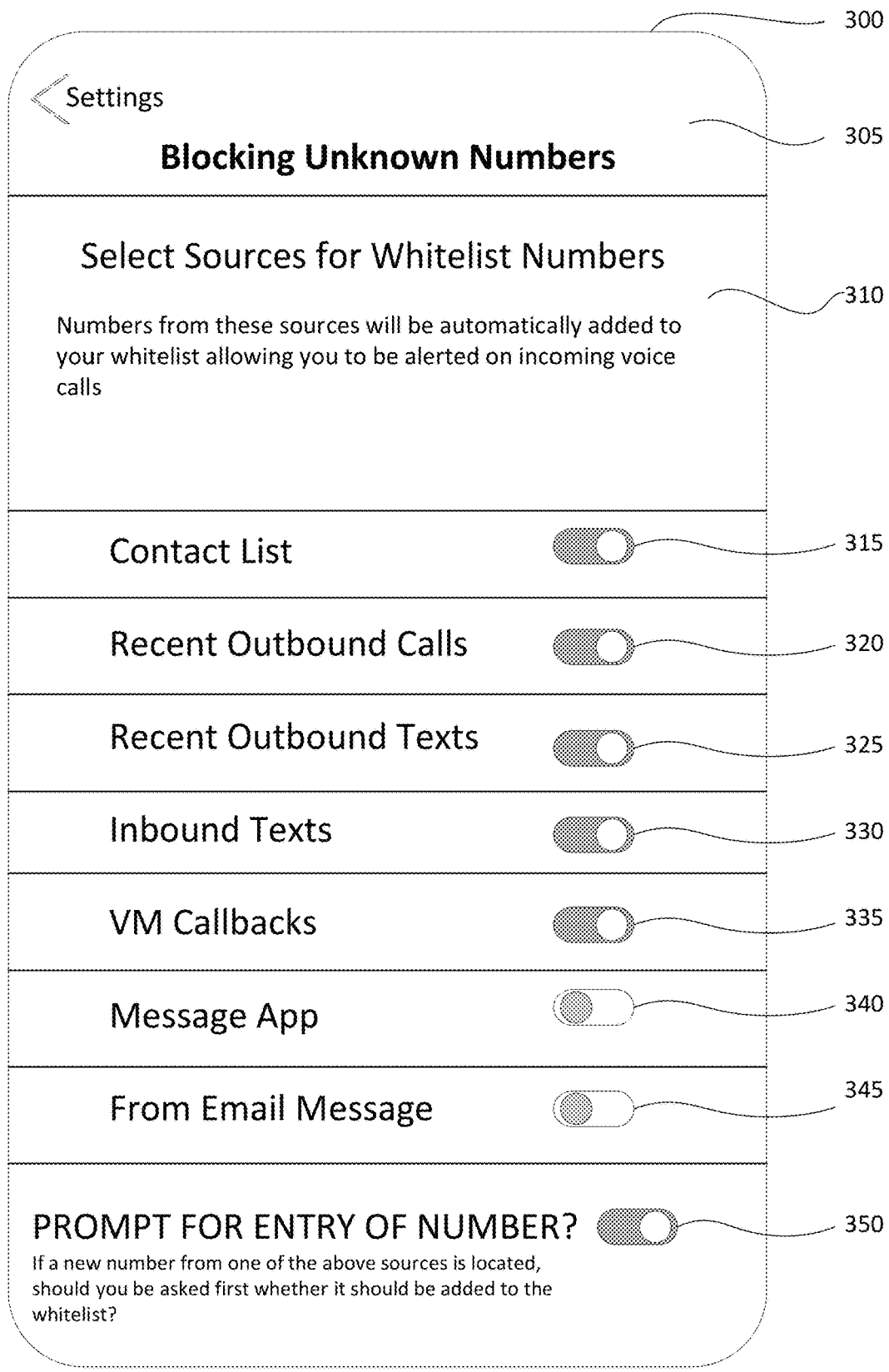
FIG. 3 illustrates one embodiment of a graphical user interface on a smartphone illustrating configuration of various number sources used to generate a whitelist in a mobile application.

However, this approach (with nothing more) provides limited control to the user of which numbers are to be included. The user may desire to control which sources are used to create the whitelist. For example, turning to FIG. 3, a user may configure their smartphone to indicate which sources are to be used. FIG. 3 shows a screenshot 300 of a smartphone with a configuration screen associated with blocking unknown numbers 305. One portion of the configuration screen 310 may allow the user to select which number sources are to be used for generating the whitelist. Then, below of each of the various options 315-350 are control toggle icons for indicating the user's preference.

The first option shown 315 indicates whether numbers in the user's contact list should be used. The contacts list typically reflects important contacts to the user, so it would be common to find this number set enabled as a source. The next source 320 includes recent outbound calls. These would be voice calls which the user dialed. If the user, e.g., manually entered a telephone number and originated a call, then it may be that the user would want to receive calls from that same number. The next source 325 involves using the destination telephone numbers included in outbound texts. Texts originated to short codes would not apply, since short codes are not telephone numbers from which an incoming call can be received from. The next source involves inbound texts 330. It can be assumed that individuals that are sending texts to the user using a telephone number are also individuals that the user would accept voice calls from. The next source involves voice mail callbacks 335. If a voice call is unanswered or is otherwise diverted to voicemail, then it would seem logical in many cases that if the user listened to the voicemail message and decided to callback that person, then the user is interested in communicating with that person and would want to receive callbacks from that number. The callback can be treated similarly to an outbound call, in that the telephone number is significant enough to be included in the whitelist. After all, the user may callback that number and encounter that person's voicemail, which may necessitate a return call. If so, the user would likely want to receive the call, rather than have it blocked. The next source involves selecting a message application ("app") 340 can be a source of wanted incoming telephone calls. Finally, another source may be an application that can parse email 345 or other forms of messaging (such as found in the closing of an email) to detect a telephone number that should be included in the whitelist.

The user may also be prompted for entry of each number in that category via control 350. This option provides a further granular level of control to the user. While the prior options of number sources refer to categories of numbers that are added to the whitelist, the prompting of a number option 350 allows control to each number within that source when encountered. The mobile application can be configured to automatically update the whitelist taking into account all numbers in that number source, or it can be configured to prompt the user as to each time the whitelist is being updated using the number source. If set to prompt the user each time, then the user may encountered a screen image 400 as shown in FIG. 4.

Figure 4:
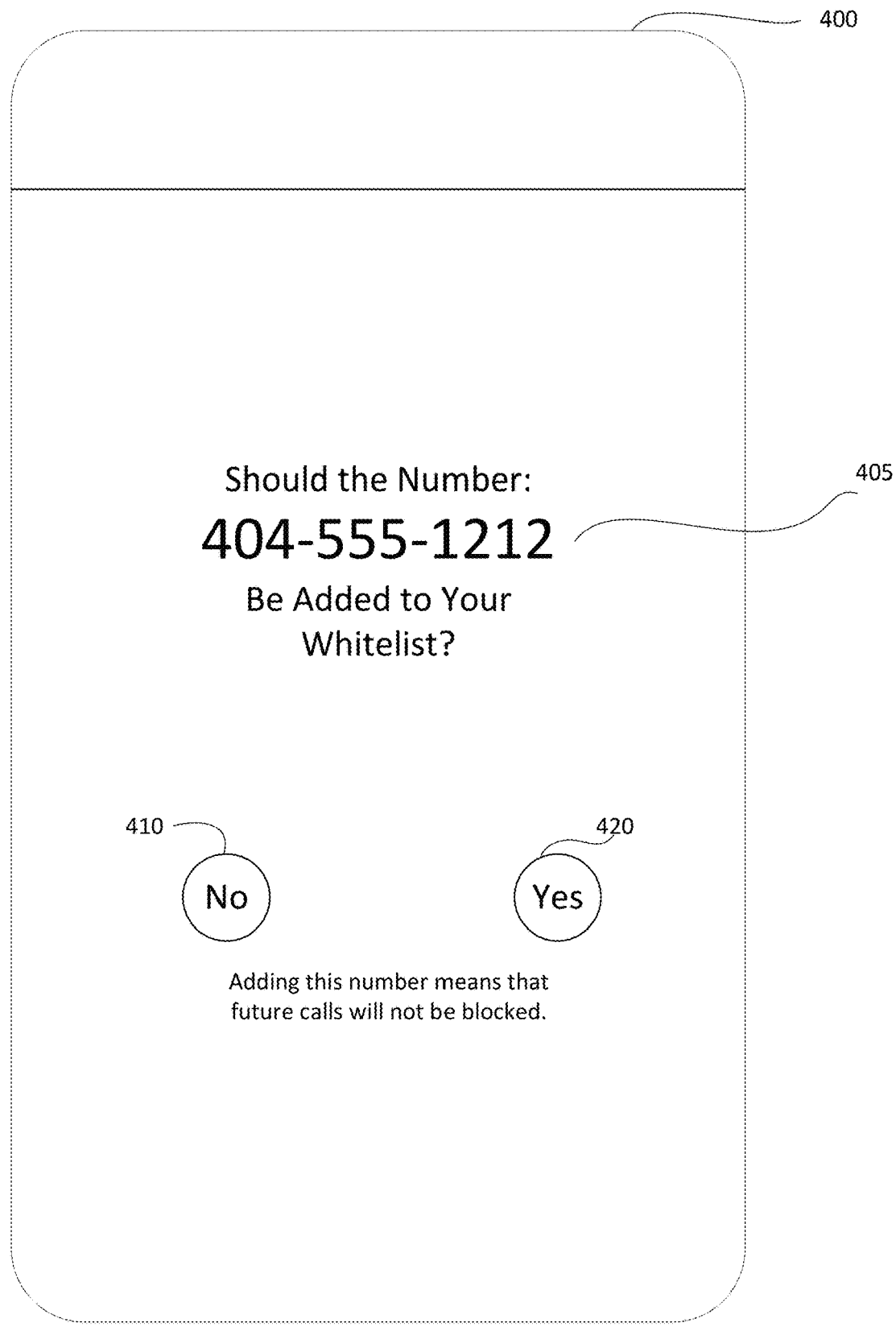
FIG. 4 illustrates one embodiment of a graphical user interface on a smartphone illustrating how a user can further control management of whether a telephone number should be added to a whitelist.

Turning to FIG. 4, the user may be prompted after an event, such as originating a call, receiving a call, updating their contacts list, returning a voicemail callback, initiating or receiving a text, etc. The screen image 400 may provide a prompt 405 to the user, asking whether a specific telephone number should be added to the whitelist. Two icons 410, 420 allow the user to respond negatively 410 or affirmatively 420 when prompted regarding the addition of the number to the whitelist. If the user does not respond with a time period of a few seconds, then a default operation of adding (or not adding) the number may be taken. Typically, this option is presented after the corresponding event is completed (e.g., a new contact is added, a new outbound call is made, a new instance message is completed, etc.).

The benefit of this approach is that it allows the user to individually manage numbers in their whitelist. For example, a user may call a local business infrequently or the call may be of little importance (i.e., the user may call to ascertain their business hours, for example). The user may be prompted to include this number in their whitelist, but may decline, since they readily can evaluate that they are not likely to call that number again. The user can readily evaluate whether they are expecting a call from that business or if they would they necessarily what to receive a call from that business. On the other hand, a user who is dropping their car at a dealer for servicing knows that the car' servicing will be completed, and that they expect to be notified when it is ready. The user can readily ascertain that this type of call would be important to receive. The user may call the dealer to arrange an appointment for servicing and knows upon completion of the call that they can expect a callback when the servicing is completed. In this case, the user would affirm adding the number to their whitelist after the call, and would likely retain this number if they expected calls in the future related to servicing their car.

In other examples, a user may receive a text message, which pertains to a notification from a business, but which the user does not want any further communications from the sender nor expects to receive further voice calls. In this case, the user may not want to add that number to their whitelist. On the other hand, the user may use texting for social interactions, and receive a text from a new social acquaintance. In this case, the user may add that number to their whitelist, so as to not miss any potential voice calls from the acquaintance, should they expect that the acquaintance may originate a voice call.

It can be appreciated that the factual circumstances in which users would want to add (or not want to add) a number to their whitelist would greatly vary in each circumstance, and hence a greater level of control is desired.

Mobile Application Processing Flow

As noted earlier, the whitelist can be implemented as a static data structure, in which the numbers in the white list are duplicated in a distinct data structure from other sources of numbers stored in the smartphone. Or, the whitelist could be implemented as a process which dynamically checks the number sources as needed. The latter is represented as a process in FIG. 5 for how a mobile application can process an incoming call in relation to the whitelist. An advantage of this approach is that it avoids having to allocate additional memory for the whitelist data structure and further avoids having to then manage the consistency of the data in the number sources with the whitelist. In this regard, it represents a technological improvement in reducing the memory allocated necessary to store the whitelist in the smartphone.

Figure 5:
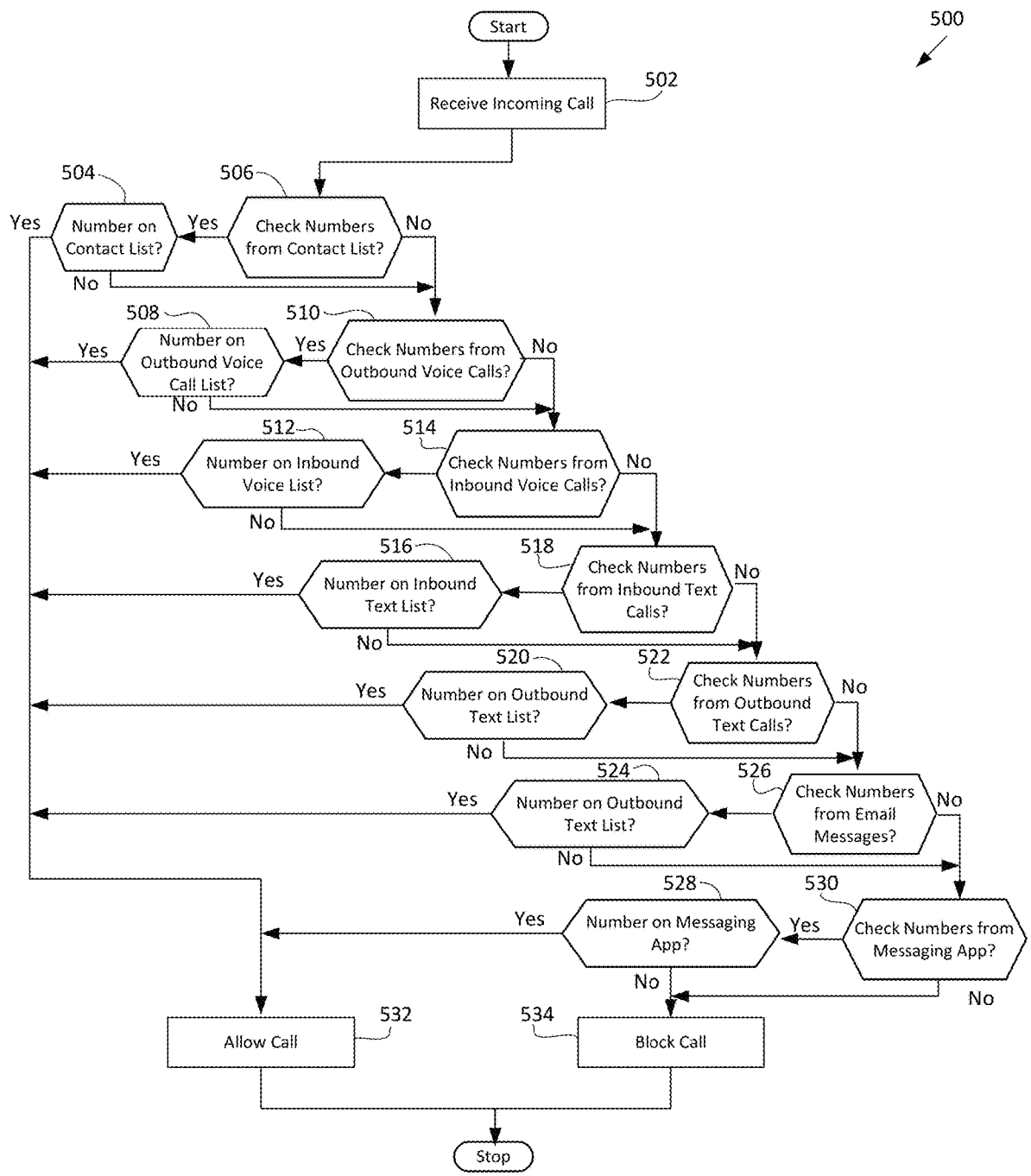
FIG. 5 illustrates one embodiment of a process flow at a high level for searching various number sources for determining whether a calling party number is on a whitelist.

Turning to FIG. 5, the process flow 500 illustrates one high level embodiment in which a smartphone can process an incoming call by checking the number against a whitelist, which involves dynamically checking the various number sources that the whitelist is defined as being based upon. The process begins in operation 502 when an incoming call is received, which has a calling party number ("CPN") indicated. The CPN is extracted and compared to the various separate number sources that the user has previously configured as being part of the whitelist. The order of the number sources checked is exemplary, and can be defined in another order.

In this embodiment, a check is first made in operation 506 as to whether the number source includes the contact list. The contact list is a directory list of names and numbers that the user may frequently access, or at least requires that information to facilitate calls when desired. If the contact list is a number source that forms the whitelist, then a check of the CPN is made in operation 504 to determine whether the CPN is found within the contact list. If the number is found, then the CPN is in the whitelist and the process proceeds to operation 532 where the call is allowed. Essentially, if the CPN is found in one of the number sources, the incoming call is allowed. There is no further need to check other number sources, as a number that is in the whitelist is allowed to proceed. However, if the number is not on the contact list in operation 504, or if the contact list is not to be checked as a number source in operation 506, then the process proceeds to check the next number source. Just because a number is not in one number source does not mean that the number may not be found in another number source.

The next number source that is checked involves the outbound voice call list in operation 510. This is a list of outbound calls, which may include a fixed number of the most recent calls (e.g., the last 20 or so outbound called numbers, or some other value). The process is very similar as described above. If the user has indicated that the outbound voice call number list is to be used in operation 510, then a check is made to determine whether the CPN is on the outbound voice call list in operation 508. If so, then the call is allowed in operation 532. If the number is not on the list in operation 508, or if the list is not to be checked in operation 510, then the next number source is checked in operation 514. In this embodiment, the next number source to be checked is the list of numbers from inbound voice calls.

The process is repeated for each of the number sources, which includes inbound text calls, outbound text calls, email messages, and message applications in operations 518, 522, 526, and 530 respectively. In each case, if the number is in the corresponding list in operations 516, 520, 524, and 528, then the call is allowed in operation 532. Otherwise, the next potential list to be checked is analyzed, until the last list or number source is checked. If the CPN is not on any of the source lists that are checked, then the call is blocked in operation 534. The blocking of the call may be manifested by various actions, such as suppression of ringing to the user, rejecting the call, forwarding the call to voicemails, or some other action.

FIG. 5 illustrates various potential source lists of numbers that can form the whitelist. In various embodiments, the whitelist may be formed from two, three, or more sources, including sources which are not shown in FIG. 5. In other embodiments, one list (such as the contact list) may be a default source, and the user can optionally configure whether other sources are to be checked. However, it should be evident that allowing the user to configure which sources are to be included in the whitelist allows the user to specify with greater precision what types of numbers are used to create the whitelist.

As mentioned earlier, the mobile application could create a separate whitelist from each of the number sources, and duplicate the numbers in a separate data structure. While this approach uses more memory, it facilitates comparing the CPN using a single list, which is retrieved and then the contents are searched and compared with the CPN. There is no requirement to identify which lists are used, and then retrieve and search each separate list (which may result in duplicative processing, since many numbers that are dialed out or received will also be in the user's contact list). Furthermore, comparing the CPN against all the various list sources potentially requires processing all of the selected list sources, since it is not known whether a number is not on the whitelist until the last number source is checked. Specifically, just because a CPN is not listed in one list does not mean it will not be found in another list; hence all the lists must be checked before it can be determine to block the call. On the other hand, a separate CPN list, where the numbers are stored in numerical order, allows faster searching since a CPN can be determined as being in the list or not just by checking the relevant ordered values. At a high level, though, the result is the same. The CPN of the calling party number of an incoming call is checked against a whitelist in some manner to determine whether to offer the call to the user or provide some other call treatment.

In order to provide further ability for the user to manage how and which numbers are included in the whitelist, the mobile application may further allow the user to configure not only which number sources (lists) are used to create the whitelist, but also control whether and how a particular number from that number source is to be added to the whitelist. For example, a user may generally want the called party number for all outgoing calls to be added to the whitelist. This would allow a user to whitelist numbers which they have dialed. Normally, a user originating a call to a called party would want to receive calls from that party. However, there are exceptions. The user may be calling someone they do not want to receive calls from.

In addition, once a whitelist is created, the user may want to selectively edit the list. There may be numbers which are added that are now undesirable. Or, there may be numbers in the list which were never intended to be added and have to be removed. The ability to edit numbers on the whitelist is related to how numbers are added to the whitelist, as shown in FIG. 6.

Figure 6:
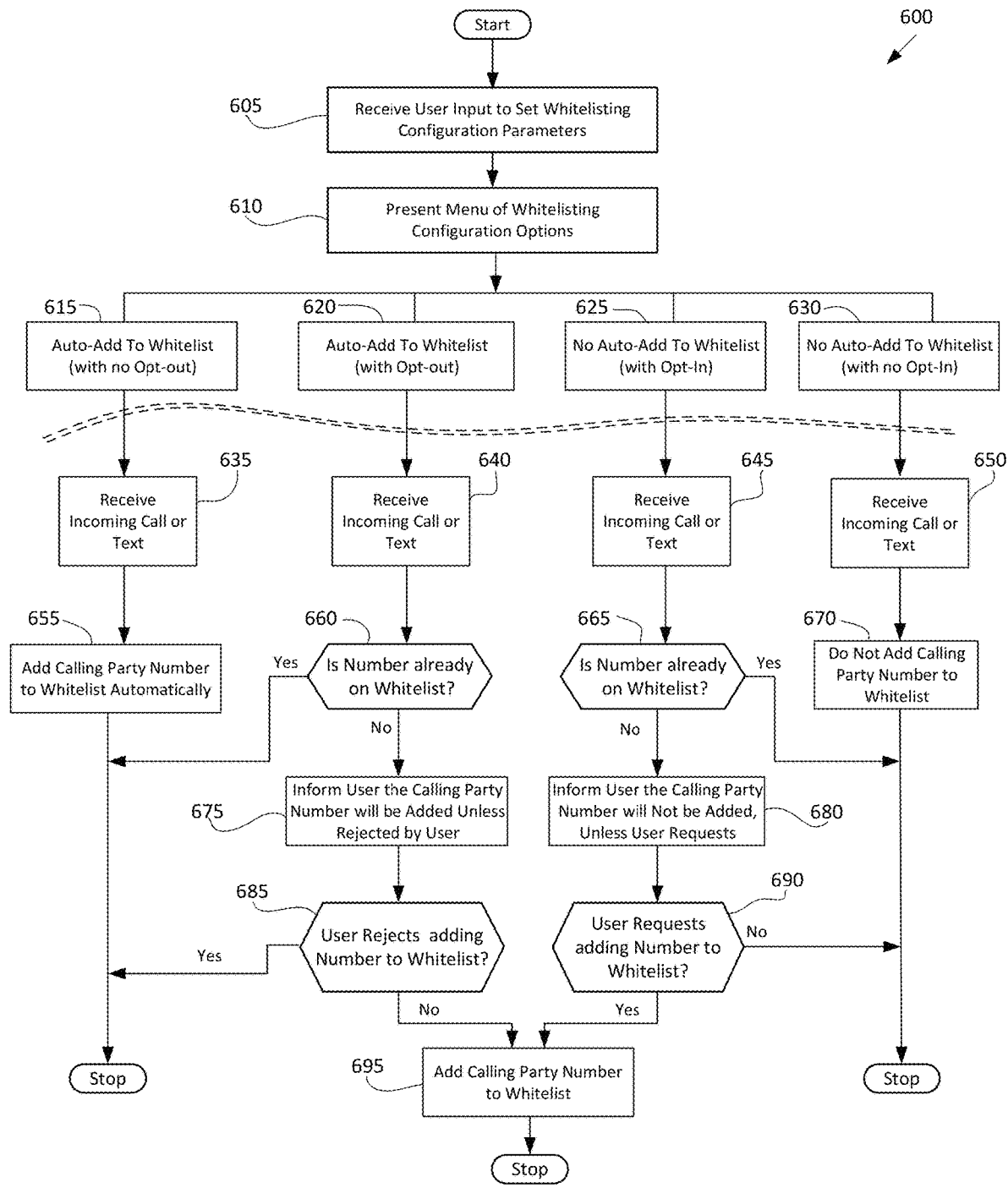
FIG. 6 illustrates one embodiment of a process flow for determining whether a calling party number should be added to a whitelist by potentially considering user input.

Turning to FIG. 6, the process 600 illustrates various ways in which the user can configure how numbers are added to the whitelist, and their respective impacts. The process 600 begins with the user requesting to define the whitelisting configuration parameters in operation 605. In response to reaching this point of the configuration process, the user is presented a menu of whitelisting configuration options in operation 610. In this embodiment, there are four potential options for how numbers can be added to the whitelist. In various embodiments, the user may be presented with just one or two options.

The first option shown in operation 615 is automatically add the CPN to the whitelist as soon as the number is found in the number source. The number is added without prompting the user. That is, there is no prompt asking the user if they don't want to add the number. Thus, depending on the selected categories of sources, as soon as the number appears in that source, it is processed and potentially added to the whitelist (if not already there). Thus, the option in operation 615 will automatically add each number to the whitelist when the number is added to the e.g., contact list, dialed for an outbound call, received on an incoming text, etc.

The next option shown in operation 620 is similar to the prior operation, except that the user is prompted to opt-out before the number is added to whitelist. The number will be added unless the user explicitly opts-out from the addition of the number to the whitelist. This option may be further configured for only certain number sources. For example, a user may select that only incoming calls receive this type of opt-out treatment. Thus, whenever an incoming call is completed, the user is prompted to reject adding the CPN to the whitelist (provided that the number not already in the whitelist). However, to avoid being presented with such an opt-out request when updating their contact list, the user may select the configuration option 615 whenever a telephone number is added as a new contact, such that the number is always added to the whitelist, without prompting.

The option shown in operation 625 is similar to the option shown in operation 620. However, this reflects a potential variation in the user interface. In this case, a new number added to a designated number source is not automatically added to the whitelist unless the user takes some sort of action after an event, which would otherwise automatically add that number. For example, in operation 625 a user may originate an outbound call, and then terminate the call. The user may invoke a function after the call in which the last number dialed is added to the whitelist. However, if the user originates another call without invoking the function, then the last number will not be updated. Thus, the user can invoke the function anytime before another call is originated in order to add the number of the first call. In other words, the number is not added unless the user specifically identifies the number to be added.

The last option, shown in operation 630 is to never automatically add a new number on a number source list to the whitelist. This approach essentially requires the user to invoke a separate function to edit the whitelist. This approach requires the user to manually generate the whitelist (via use of a whitelist editing function), and hence is not automatically populated in any way. The prior options offer some sort of assistance in suggesting or adding numbers to the whitelist. The use of a separate whitelist editing function to edit/generate a whitelist can work not only with this option, but with the prior options as well. Thus, if a number is automatically added to the whitelist, or added in error, the user can always separately edit the whitelist regardless of how the whitelist was generated.

Next, at some point later when the user has exited the menu configuration section, an incoming voice call or text is received. Addressing operation 635, this pertains to always automatically adding the CPN to the whitelist (assuming it is not already listed). Thus, the CPN is added to the whitelist automatically at operation 655. The process is completed. Should the user desire to remove the number, the user will have to invoke the whitelist editing function separately.

If the user has configured the operation to automatically add the CPN to the whitelist with an opt-out in operation 620, then after a call is received in operation 640, the CPN will be reviewed in operation 660. If the number is already on the whitelist, then process is completed. Assuming it is not, the user is informed (either at that time or after the call or text is received) that the CPN will be added unless the user indicates the number should not be added. In some embodiments, the failure of a user providing input will be interpreted as adding the number to the whitelist. Thus, if the user rejects or opts-out from having the number added in operation 685, then the process stops. If the user does not reject or opt-out, then the CPN is added to the whitelist in operation 695.

If the user has configured the operation to not automatically add the CPN to the whitelist in operation 625, then when an incoming voice call or text is received in operation 645 the process again checks where the CPN is already on the whitelist. If so, the process is completed and stops. If not, then the process continues to operation 680 which informs the user that the number will not be added unless the user requests (i.e., indicates an opt-in for the CPN). If the user so indicates, then the number is added to the whitelist in operation 695. If the user does not so indicate, then the number is not added and the process stops.

If the configuration is set in operation 630 to not automatically add the number to the whitelist, then when an incoming voice call or text is received in operation 650 the number is not added to the whitelist in operation 670. The user can add the number to the whitelist separately via a whitelist editing function that allows numbers to be added/remove or changed to the whitelist. However, this configuration option does not provide any automatic addition to the whitelist contents based on voice calls or texts.

The above is illustrated as operating on the CPN of an incoming voice call or text, but the process and configuration options can be equally applied to CPNs found in instant messages, emails, contact lists, etc.

By allowing the user to manage which number sources are used to populate the whitelist, and how numbers from each of those number sources are to be added, the user is given greater flexibility in controlling how the whitelist is populated. In each scenario, the user can still access a whitelist editing function for correcting or updating the whitelist based on information subsequently obtained.

Exemplary Computer Processing System

Figure 7:
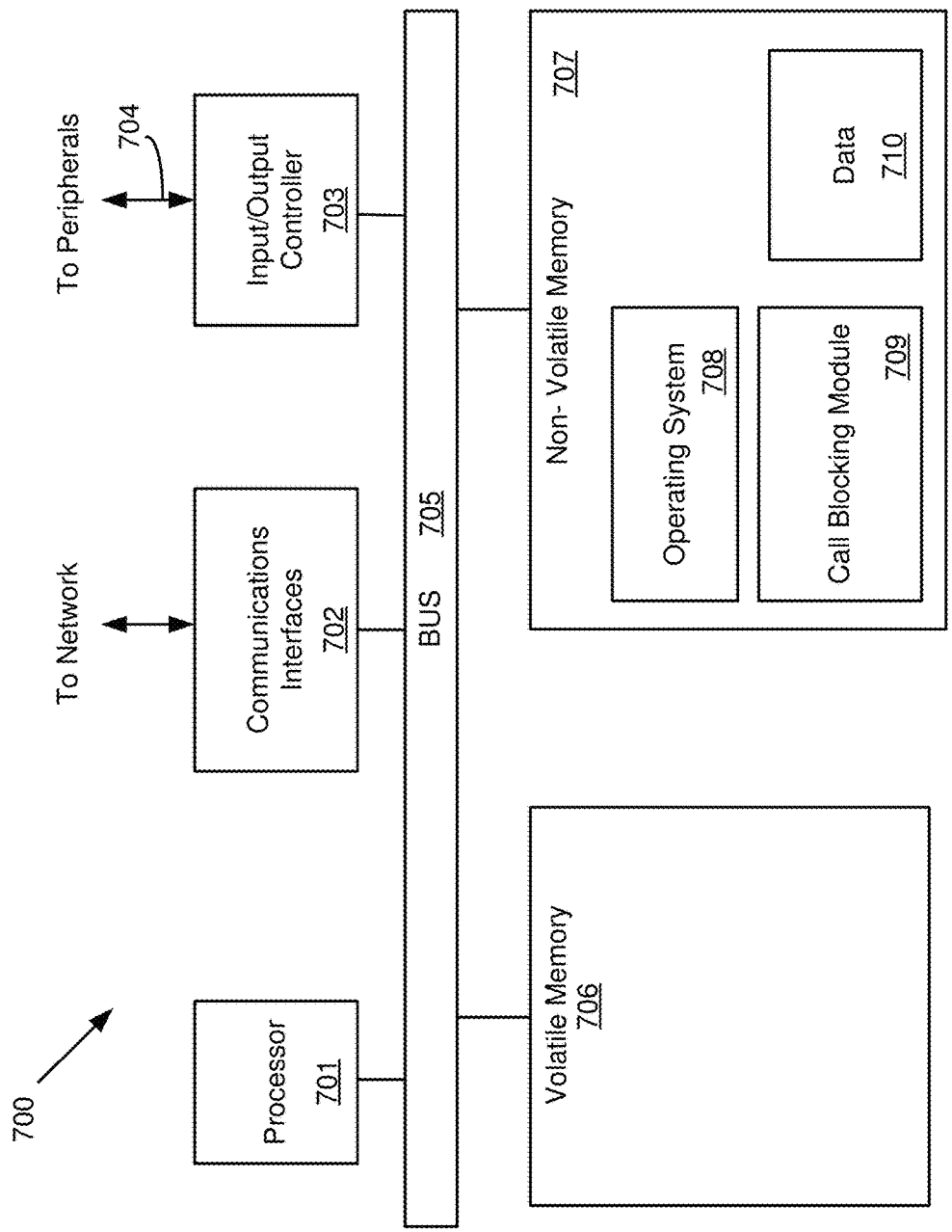
FIG. 7 illustrates an embodiment of a processing device for practicing various technologies and concepts disclosed herein.

FIG. 7 is an exemplary schematic diagram of a computer processing system that may be used in embodiments of various architectures, such as the architecture 100 shown in FIG. 1, to practice the technologies disclosed herein. In general, the term "computer processing system" may be exemplified by, for example, but without limitation: a personal computer, server, desktop computer, tablets, smartphones, notebooks, laptops, distributed systems, servers, blades, gateways, switches, and the like, as well as any combination of devices or entities adapted to perform the functions described herein.

As shown in FIG. 7, the processing system 700 may include one or more processors 810 that may communicate with other elements within the processing system 700 via a bus 705. The processor 701 may be implemented as one or more complex programmable logic devices ("CPLD"), microprocessors, multi-core processors, digital signal processors ("DSP"), system-on-a-chip ("SOC"), co-processing entities, application-specific integrated circuits ("ASIC"), field programmable gate arrays ("FPGA"), programmable logic arrays ("PLA"), hardware accelerators, other circuitry, or the like.

In one embodiment, the processing system 700 may also include one or more communications interfaces 702 for communicating data via a network with various external devices. In various embodiments, communication may be via wired, optical, or wireless networks (or a combination thereof). The communication may use a variety of data transmission protocols, such as fiber distributed data interface (FDDI), Ethernet, asynchronous transfer mode ("ATM"), or frame relay.

The input/output controller 703 may also communicate with one or more input devices or peripherals using an interface such as, but not limited to: a keyboard, a mouse, a touch screen/display input, microphone, pointing device, etc. The input/output controller 703 may also communicate with output devices or peripherals, such as displays, printers, speakers, headsets, banner displays, etc.

The processor 701 may be configured to execute instructions stored in volatile memory 706, non-volatile memory 707, or other forms of computer readable storage media accessible to the processor 701. The volatile memory may comprise various types of memory technologies, including, but not limited to: random access memory ("RAM"), dynamic random access memory ("DRAM"), static random access memory ("SRAM"), and other forms well known to those skilled in the art. The non-volatile memory may comprise various technologies, including, but not limited to: storage media such as hard disks, floppy disks, read only memory ("ROM"), programmable read only memory ("PROM"), electrically erasable read only memory ("EPROM"), flash memory, and other forms well known to those skilled in the art.

The non-volatile memory 707 may store program code and data, which also may be loaded into the volatile memory 706 at execution time. For example, the non-volatile memory 707 may store one or more modules 709 that may perform the above-mentioned process flows and/or operating system code 708 containing instructions for performing the process and/or functions associated with the technologies disclosed herein. The module(s) 709 may also access, generate, or store related data in the non-volatile memory 707, as well as in the volatile memory 706. The volatile memory 706 and/or non-volatile memory 707 may be used to store other information including, but not limited to: records, applications, programs, scripts, source code, object code, byte code, compiled code, interpreted code, machine code, executable instructions, or the like. These may be executed or processed by, for example, the processor 701 and may form a part of, or may interact with, the module(s) 709.

The technologies described herein may be implemented in various ways, including as computer program products comprising memory storing instructions causing a processor to perform the operations associated with the above technologies. The computer program product may comprise a non-transitory (tangible) computer readable storage medium storing applications, programs, program modules, scripts, source code, program code, object code, byte code, compiled code, interpreted code, machine code, executable instructions, and/or the like (also referred to herein as executable instructions, instructions for execution, program code, and/or similar terms). Such non-transitory computer readable storage media include all the above identified computer readable media (including volatile and non-volatile media), but does not include a transitory, propagating signal, nor does it encompass a non-tangible computer readable medium. Non-volatile computer readable storage medium may specifically comprise: a floppy disk, flexible disk, hard disk, magnetic tape, compact disc read only memory ("CD-ROM"), compact disc compact disc-rewritable ("CD-RW"), digital versatile disc ("DVD"), Blu-ray™ disc ("BD"), any other non-transitory optical medium, and/or the like. Non-volatile computer readable storage medium may also comprise read-only memory ("ROM"), programmable read-only memory ("PROM"), erasable programmable read-only memory ("EPROM"), electrically erasable programmable read-only memory ("EEPROM"), flash memory, and/or other technologies known to those skilled in the art.

CONCLUSION

Many modifications and other embodiments of the concepts and technologies set forth herein will come to mind to one skilled in the art having the benefit of the teachings presented in the foregoing descriptions and the associated drawings. Therefore, it is to be understood that embodiments other than the embodiments disclosed herein are intended to be included within the scope of the appended claims. Although specific terms may be employed herein, they are used in a generic and descriptive sense only and not for purposes of limitation.

The invention claimed is:

1. A mobile smartphone device for receiving voice calls, comprising: one or more computer processors; and a non-transitory medium storing a computer program comprising instructions causing the one or more computer processors to perform operations comprising:
receiving, by the mobile smartphone device, user input comprising an selection of at least one of one or more telephone number sources, the number sources comprising at least one list of a contact list comprising corresponding contact telephone numbers, a list of outbound voice calls comprising corresponding called party telephone numbers, or a list of one or more inbound email messages comprising a corresponding telephone number;
identifying a telephone number from the at least one or more selected number sources;
adding the identified telephone number to a whitelist in response to identifying the telephone number from the at least one or more selected number sources;
receiving an incoming voice call from the identified telephone number after the telephone number is added to the whitelist; and
generating an alerting indication for the incoming voice call in response to determining the incoming voice call is from the identified telephone number in accordance with a determination that the identified telephone number is in the whitelist.

2. The mobile smartphone device of claim 1, wherein the selection reflects two or more number sources stored in the memory of the mobile smartphone device are to be used to define the whitelist.

3. The mobile smartphone device of claim 1, wherein the non-transitory medium storing the computer program comprising instructions further causes the one or more computer processors to provide a prompt to a user of the mobile smartphone device to add a dialed number to the whitelist after an outbound call to the dialed number is completed.

4. The mobile smartphone device of claim 1, wherein the non-transitory medium storing the computer program comprising instructions further causes the one or more computer processors to provide a prompt to a user of the mobile smartphone device to add a telephone number in the contact list to the whitelist.

5. The mobile smartphone device of claim 1, wherein the non-transitory medium storing the computer program comprising instructions further causes the one or more computer processors to add an originating telephone number from an incoming text to the whitelist.

6. The mobile smartphone device of claim 1, wherein the non-transitory medium storing the computer program comprising instructions further causes the one or more computer processors to confirm that the telephone number of the incoming voice call is equal to a telephone number in the whitelist.

7. The mobile smartphone device of claim 1, wherein the non-transitory medium storing the computer program comprising instructions further causes the one or more computer processors to duplicate in the memory a plurality of telephone numbers in the whitelist from the one or more number sources used to define the whitelist.

8. A non-transitory medium storing a computer program in a mobile smartphone device comprising instructions causing the one or more computer processors in the mobile smartphone device to perform operations comprising:
receiving, by the mobile smartphone device, user input comprising an selection of at least one of one or more telephone number sources, the number sources comprising at least one list of a contact list comprising corresponding contact telephone numbers, a list of outbound voice calls comprising corresponding called party telephone numbers, or a list of one or more inbound email messages comprising a corresponding telephone number;
identifying a telephone number from the at least one or more selected number sources;
adding the identified telephone number to a whitelist in response to identifying the telephone number from the at least one or more selected number sources;
receiving an incoming voice call from the identified telephone number after the telephone number is added to the whitelist; and
generating an alerting indication for the incoming voice call in response to determining the incoming voice call is from the identified telephone number in accordance with a determination that the identified telephone number is in the whitelist.

9. The non-transitory medium storing a computer program in a mobile smartphone device of claim 8, wherein the selection reflects two or more number sources stored in the memory of the mobile smartphone device are to be used to define the whitelist.

10. The non-transitory medium storing a computer program in a mobile smartphone device of claim 8, wherein the non-transitory medium storing the computer program comprising instructions further causes the one or more computer processors to provide a prompt to a user of the mobile smartphone device to add a dialed number to the whitelist after an outbound call to the dialed number is completed.

11. The non-transitory medium storing the computer program in a mobile smartphone device of claim 8, wherein the non-transitory medium storing the computer program comprising instructions further causes the one or more computer processors to provide a prompt to a user of the mobile smartphone device to add a telephone number in the contact list to the whitelist.

12. The non-transitory medium storing the computer program in a mobile smartphone device of claim 8, wherein the non-transitory medium storing the computer program comprising instructions further causes the one or more computer processors to add an originating telephone number from an incoming text to the whitelist.

13. The non-transitory medium storing the computer program in a mobile smartphone device of claim 8, wherein the non-transitory medium storing the computer program comprising instructions further causes the one or more computer processors to confirm that the telephone number of the incoming voice call is equal to a telephone number in the whitelist.

14. The non-transitory medium storing the computer program in a mobile smartphone device of claim 8, wherein the non-transitory medium storing the computer program comprising instructions further causes the one or more computer processors to duplicate a plurality of telephone numbers in the whitelist in the memory from the one or more number sources used to define the whitelist.

15. A method for a mobile smartphone device to process an incoming voice calls, comprising:
   receiving, by the mobile smartphone device, user input comprising an selection of at least one of one or more telephone number sources, the number sources comprising at least one list of a contact list comprising corresponding contact telephone numbers, a list of outbound voice calls comprising corresponding called party telephone numbers, or a list of one or more inbound email messages;
   identifying a telephone number from the at least one or more selected number sources;
   ascertaining the telephone number is not in the whitelist;
   adding the identified telephone number to a whitelist in response to identifying the telephone number from the at least one or more selected number sources;
      receiving an incoming voice call from the identified telephone number after the telephone number is added to the whitelist; and
   generating an alerting indication for the incoming voice call in response to determining the incoming voice call is from the identified telephone number in accordance with a determination that the identified telephone number is in the whitelist.

16. The method of claim 15, wherein the selection reflects two or more number sources stored in memory of the mobile smartphone device are to be used to define a whitelist.

17. The method of claim 15, further comprising:
   prompting to a user of the mobile smartphone device to add a dialed number to the whitelist after an outbound call to the dialed number is completed.

18. The method of claim 15, further comprising:
   adding an originating telephone number from an incoming text to the whitelist.

19. The method of claim 15, further comprising:
   checking the calling party number of the incoming voice call is equal to the telephone number in the whitelist by confirming that the telephone number of the incoming voice call is equal to a telephone number in the whitelist.

20. The method of claim 15, further comprising:
   duplicating in the memory a plurality of telephone numbers in the whitelist from the one or more number sources used to define the whitelist.

* * * * *